(12) United States Patent
Blanc et al.

(10) Patent No.: US 6,452,900 B1
(45) Date of Patent: Sep. 17, 2002

(54) FLOW CONTROL PROCESS FOR A SWITCHING ARCHITECTURE USING AN OUT-OF-BAND FLOW CONTROL CHANNEL AND APPARATUS FOR PERFORMING THE SAME

(75) Inventors: Alain Blanc, Vence; Bernard Brezzo, Nice; Pierre Debord, Tourrettes sur Loup, all of (FR); Albert Widmer, Katonah, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/207,061

(22) Filed: Dec. 7, 1998

(30) Foreign Application Priority Data

Feb. 19, 1998 (EP) .............................. 98480006

(51) Int. Cl.[7] ................................. H04L 1/00
(52) U.S. Cl. ................ 370/229; 370/231; 370/235; 370/239; 375/377
(58) Field of Search ................ 370/229, 231, 370/232, 235, 236; 375/377, 356, 286, 288, 292, 289

(56) References Cited

U.S. PATENT DOCUMENTS

| | | | | |
|---|---|---|---|---|
| 4,829,511 A | * | 5/1989 | Georgiou | 359/117 |
| 4,958,341 A | | 9/1990 | Hemmady et al. | 370/352 |
| 5,048,062 A | * | 9/1991 | Gregg et al. | 375/365 |
| 5,598,442 A | * | 1/1997 | Gregg et al. | 375/347 |
| 5,610,945 A | * | 3/1997 | Gregg et al. | 375/260 |
| 5,638,518 A | | 6/1997 | Malladi | 709/251 |
| 5,907,566 A | * | 5/1999 | Benson et al. | 714/798 |
| 6,014,383 A | * | 1/2000 | McCarty | 370/453 |
| 6,111,528 A | * | 8/2000 | Bagley | 341/58 |
| 6,118,612 A | * | 9/2000 | Judd et al. | 360/73.03 |

FOREIGN PATENT DOCUMENTS

| | | | | |
|---|---|---|---|---|
| JP | 06-37804 | 6/1994 | ........... | H04L/12/56 |
| JP | 07-170258 | 7/1995 | ........... | H04L/11/00 |
| JP | 10-135968 | 10/1998 | ........... | H04L/12/56 |
| WO | 9530318 | 9/1995 | ........... | H04Q/11/04 |

OTHER PUBLICATIONS

Widmer A. X. et al. "A DC–Balanced, Partitioned–Block, 8B/10B Transmission Code" IBM Journal of Research and Development, US, IBM Corp. Armonk, vol. 27, No. 5, (Sep. 1, 1983).

Benner Alan F.: "Fibre Channel—Gigabit Communications and I/O for Computer" Networks, McGraw Hill (1996) pp 79–92.

IEEE Globecom '94 pp 1801–1807.

* cited by examiner

*Primary Examiner*—Hassan Kizou
*Assistant Examiner*—Saba Tsegaye
(74) *Attorney, Agent, or Firm*—Scott W. Reid

(57) ABSTRACT

A flow control process for a switching architecture having a central switch core with associated distributed Switch Core Access Layers communicating with the core by means of serial data communication links. The serial links carry data flows that are coded in accordance with the 8B/10B coding, where two among the three comma characters are used for creating an additional specialized flow control channel. When the cells are idle or empty, the nature of the comma character that appears at the beginning of the cell provides the appropriate flow control bit information. For instance, should the K.28.5 character be detected, the receiving entity (either the switching structure or a distributed SCAL element) decodes the character as positive flow control information, corresponding to a request to reduce the incoming data flow. Also, should the K.28.1 character be decoded, then the receiving entity decodes this as information according to which no reduction in the data flow is requested. When the incoming flow provides data cells, the invention uses a predetermined bit within the data cell, generally that immediately following the beginning of the cell, in order to carry the flow control information.

9 Claims, 3 Drawing Sheets

US 6,452,900 B1

FLOW CONTROL PROCESS FOR A SWITCHING ARCHITECTURE USING AN OUT-OF-BAND FLOW CONTROL CHANNEL AND APPARATUS FOR PERFORMING THE SAME

TECHNICAL FIELD

The invention relates to the telecommunications field and particularly to switching architectures which use serial telecommunication links transporting 8B/10B coding.

BACKGROUND ART

Patent applications 96480126.0, 96480125.2, 96480117.9, 96480120.3 are non-published European applications illustrating a powerful self-routing switch that provides a high switch rate.

Modem switching architectures requires powerful switching structures and distributed Switch Core Access Layer (SCAL) elements that provide the attachment of the telecommunications lines. Such an architecture can be found in the copending application filed on the priority date of the present application, and entitled "Flow Control Process for a Switching System and System for Performing the Same" and assigned to the assignee of the present application, which is herein incorporated by simple reference.

Since the central switching structure has some limited switching capacity it may obviously happen that, on one or more input ports, the switching structures require reducing the incoming flow of data that arrives in the port. Obviously this is achieved by means of a special channel that provides the flow control information for that purpose.

However since the distance between the switching structure and the different distributed entities (SCAL elements) that can be located in different premises within an industrial area tends to increase, even attaining separations some hundreds of meters, it is highly desirable that the flow control channel does not use any additional physical media. Known techniques to provide such flow control channels may use cell overhead by dedicating some of the bits that are conveyed to this particular flow control information. However, this results in waste of the useful bandwith.

This requirement is even more critical when the switching architecture is based on a port expansion mode, resulting in a great number of individual switches being connected.

SUMMARY OF THE INVENTION

The problem to be solved by the present invention is to provide an improved flow control channel for high speed switching architectures based on a centralized switching structure and distributed Switch Core Access Layers (SCAL) entities that does not require additional physical media or use a minimum part of the available bandwith.

It is an object of the present invention to provide a flow control channel for a switching architecture which can be used even when it is mounted in a port expansion mode.

This problem is solved by the flow control channel of the present invention which uses two among the three available "comma characters" in order to create this specific flow control channel. When the cells are idle or empty, the nature of the comma character that appears at the beginning of the cell provides the appropriate flow control bit information. For instance, should the K.28.5 character be detected, the receiving entity (either the switching structure or a distributed SCAL element) shall decode the latter as positive flow control information, corresponding for instance to a request to reduce the incoming data flow. Also, should the K.28.1 character be decoded, then the receiving entity shall decode it as information according to which no reduction in the data flow is requested. When the incoming flow provides data cells, the invention uses a predetermined bit within the data cell, generally that immediately following the beginning of the cell, in order to carry the flow control information.

Preferably, the invention uses a second channel which is also based on the empty cells and which is used for transporting quasi-static information that does not require immediate transport. This provides an effective combination of two distinct control channels, a first cell frequency channel such as defined above (providing a one-bit flow control channel at the cell rate) and a second quasi-static control channel for control information that does not need immediate transport or for which real time requirements are less important.

The invention can be improved by using an additional specific mechanism that monitors, at the transmitting point, the change of one control information which is to be transported through the quasi-static control channel. From the instant of the change, the mechanism initiates a counting process that automatically launches, if necessary, the creation of an empty cell so that the change of the considered control information can be transmitted and reported to the other side of the serial link within a maximum specified delay (also called edge distortion).

The invention also provides a switching system having an effective flow control mechanism.

DESCRIPTION OF THE PREFERRED EMBODIMENT OF THE INVENTION

Figure 1:
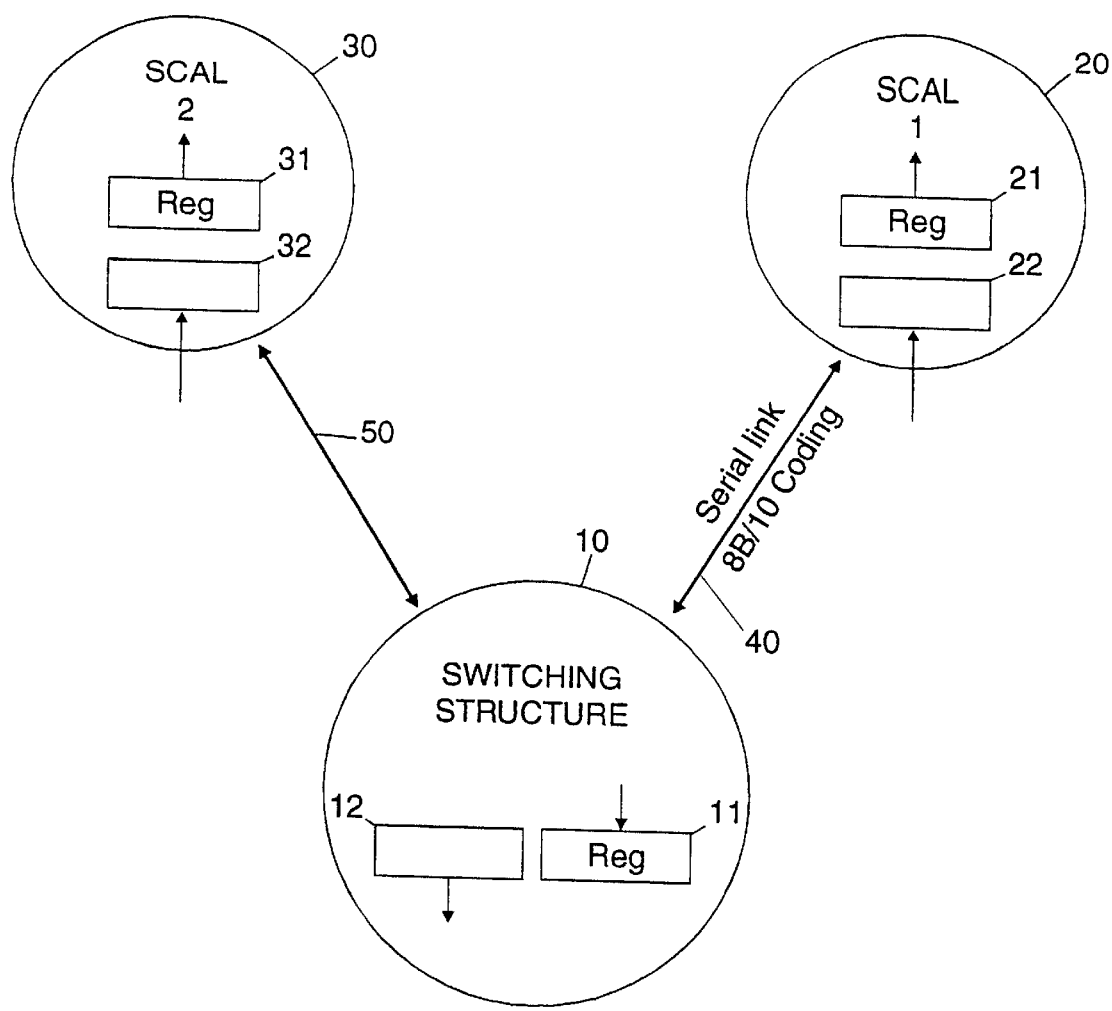
FIG. 1 illustrates a switching architecture based on a centralized switching structure and distributed SCAL entities.

With respect to FIG. 1 there is shown a switching structure 10 that is used for switching cells that come from different distributed Switch Core Access Layer entities. For clarity purposes two distinct SCAL entities are represented in the figure: SCAL 20 that may be located within a first premises while a SCAL 30 can be located in another premises. Each SCAL element is arranged in order to provide the appropriate attachments to the particular telecommunication lines.

A high speed serial communication link 40 is established between centralized switching structure 10 and SCAL 20 and a similar communication link 50 is established between structure 10 and SCAL 30. The communication links 40 and 50 between the centralized switching structure and the corresponding SCAL entity is based on one or more individual serial electrical or optical links that transport cells with an 8B/10B appropriate encoding, such as described in prior art document "A DC-Balanced, Partitioned-Block, 8B/10B Transmission Code" by A. X. Widmer et al, in IBM J. Res. Develop., vol. 27, n Sep. 5, 1983 and used as described "Single-Chip 4×500–Mbd CMOS Transceiver" in IEEE Journal of Solid-State Circuits, December 1996, Vol. 31, number 12 by A. X. Widmer et al.

However, it is necessary to be able to transport some control information between the switching structure and the SCAL element. Two different types of control informations coexist. A first type of control information is likely to change at the cell frequency, and is related to the most essential part of the switching mechanism, that is to say the flow control processing. Such control information, whose size appears to be very limited (one bit per cell), must be transported at the cell rate in order to avoid any loss of information (in the case where the switching buffers are overloaded). In the invention, this very limited information can be immediately transmitted by means of a specifically designed cell frequency channel. This is achieved by means of the use of two different comma characters among the three available ones in order to build this specific flow control channel. When the cells are idle or empty, the nature of the comma character that appears at the beginning of the cell provides the appropriate flow control bit information. For instance, should the K.28.5 character be detected, the receiving entity (either the switching structure or a distributed SCAL element) shall decode the character as positive flow control information, corresponding for instance to a request to reduce the incoming data flow. Also, should the K.28.1 character be decoded, then the receiving entity shall decode this character as information according to which no reduction in the data flow is requested. When the incoming flow provides data cells, no comma character appears in the data flow and, in this case, the invention advantageously uses a predetermined bit within the data cell, generally one that is in the first byte of the data cell in order to carry the flow control information.

In addition to the flow control information that must be transported via the serial link at the cell rate, the invention transports a second kind of control information that will be conveyed through a quasi-static channel as hereinafter described. Such information includes information that relates to maintenance and error recovery procedures and only requires a transport to the opposite side within a predetermined delay that corresponds to a given edge distortion. In the invention, this second kind of information is processed as follows. In the centralized switching structure, as well as the associated distributed SCAL elements, the invention uses a set of registers for storing the states of the control information to be conveyed. For instance, switching structure 10 includes registers 11 and 12. Register 11 stores the control bit information that is received from an internal (not shown) processor or specific hardware circuits and which is to be transmitted through one of the two illustrated serial links. Conversely, register 12 receives the control bit information from one of the two serial links, and provides the received control information to the internal processing unit or to the above mentioned hardware circuitry. Similarly, SCAL 20 (resp. 30) includes two registers 21 and 22 (resp. 31 and 32). Register 21 (resp. register 31) stores the information that is received from serial link 40 (resp. 50) and which is to be provided to the internal electronic circuitry of SCAL 20 (resp. SCAL 30). Register 22 (resp. register 32) stores the information that is received from the internal hardware circuit inside SCAL 20 (resp. SCAL 30) and which has to be conveyed through the serial link 40 (resp. 50).

In order to ensure optimal operation of the switch, it is absolutely necessary that the contents of register 11 must be reported and copied within register 21 (resp. 31) during the specified delay that complies with the desired edge distortion specifications. Conversely, the contents of the register 22 (resp. 32) must be conveyed through the corresponding link and reported to register 12 of switching structure 10. In the preferred embodiment of the invention, this is achieved by means of a second quasi-static channel which is based on the empty cells. Consider for instance the transport of the control information that is stored within register 11 and which must be conveyed through link 40, and copied into register 22.

When no data cell is to be transmitted, the cell transmission system that is used within the switching structure uses the contents of register 11 and transmits the contents at a predetermined position within the empty cell that begins with a comma character. It should be noted that the comma character is one of the two comma characters mentioned above so that, concurrently, the two types of control information—the flow control and the control information—can be transported. In the preferred embodiment of the invention, the contents of register 11 is located in the first byte that immediately follows the comma character. This information can then be detected and reported into the corresponding register 21 (resp. 31 ) of SCAL 20 (resp. SCAL 30). The person skilled in the art will obviously design the circuit to achieve the comma character detection, and then provide the transfer of the contents of a predetermined position of the cell into the appropriate register 21 (resp. 31).

Similarly, the contents of register 22 (resp. 32) is transmitted in empty cells at a predetermined location, which is, in the preferred embodiment, the first byte of the empty cell so that the contents can be copied into register 12 of centralized switching structure 10.

The quasi-static channel in accordance with the present invention is enhanced by an additional mechanism that ensures that the contents of the register 11 (within centralized structure 10) be reported into its corresponding register 21 (resp. 31) within maximum delay that corresponds to the desired edge distortion requirements. To achieve this, a monitoring circuit is used for detecting any change within the contents of register 11 and, in response to such a change, to initiate a counting process of k cell cycles. When an empty cell appears to be transmitted by centralized structure 10 - because of an instantaneous lack of a data cell, the mechanism uses that empty cell in order to transport the contents of register 11 and reset the counting process. However, when the counting process completes without the occurrence of any empty cell, the invention launches the creation of an empty cell that will ensure the transportation of the contents of register 11 to the corresponding register 21 (resp. 31) at the opposite side of the serial link of SCAL 20 (resp. SCAL 30). Therefore, the maximum distortion will be limited to k cell cycles.

Figure 2:
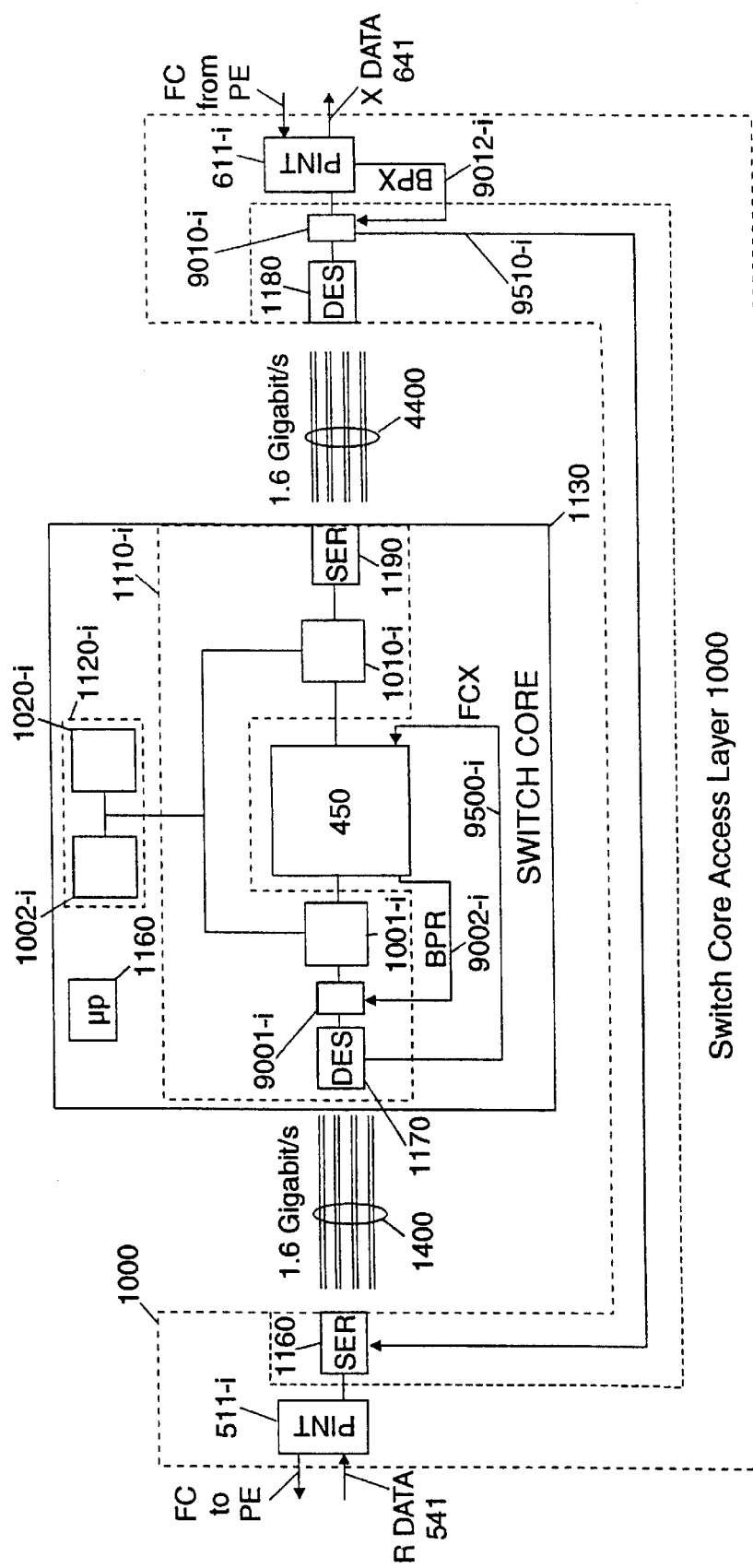
FIG. 2 illustrates how a flow control signal is generated in order to create an empty cell to transport control information to a SCAL element.
Figure 3:
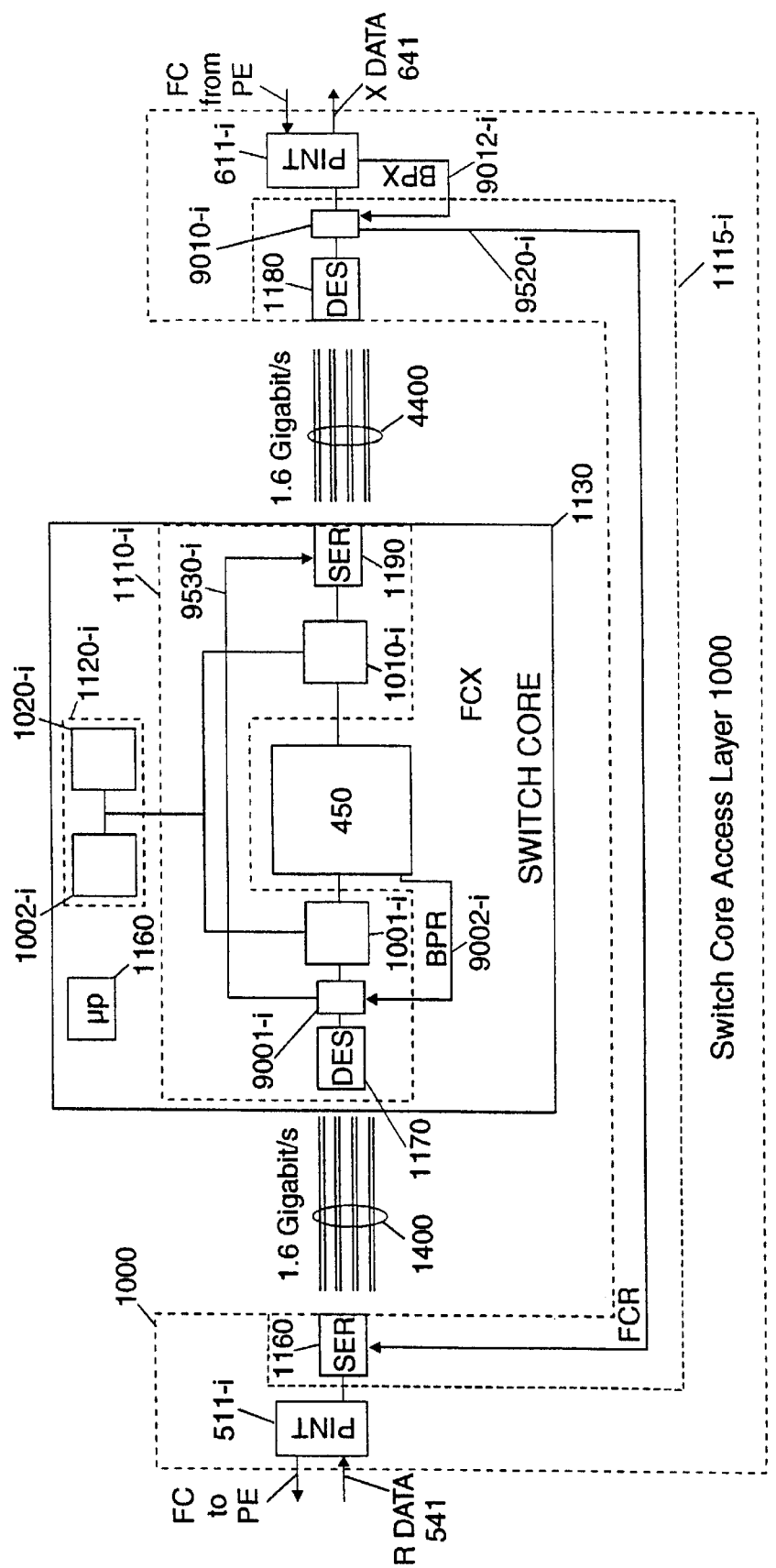
FIG. 3 illustrates how a flow control signal is generated in order to create an empty cell to transport control information to the switching structure.

In the invention, the creation of the empty cell is advantageously performed by means of the creation of a local flow control signal such as illustrated in FIGS. 2 and 3. FIGS. 2 and 3 show the particular structure of the centralized switching structure 10, and the SCAL entity 20 (resp. 30) and which is more particularly described in the above mentioned copending application incorporated herein by reference.

FIG. 2, shows how the local flow control signal is generated in order to create an empty cell so that the contents of register 11 can be transported through the serial link 40 (resp. 50).

Basically, the centralized switching structure 1130 comprises a switch core element 450 providing for the switching of a set of n input and output ports, a set of n dedicated modules 1110, one module for one input and output port, that comprises a deserializer DES 1170, a serializer SER 1190, a set of two routing control circuits 1001-i and 1010-i whose function is described in greater detail in the above-mentioned application, and a cell storage 1 which is used for providing some queuing resources for the data cells. The centralized switching structure 1130 further comprises processing resources under the form of a processor 1160 and a set of n storage elements 1120 that provides the space required for the storage of the routing bit map that is associated with the routing index.

In order to achieve the empty cell creation, module 1110 uses an edge detector for detecting the changes brought to register 11 (not shown in FIG. 2) and a hardware counter that is used for counting a predetermined number of cell cycles (for instance k). In the invention, whenever the serializer SER 1190 that is represented in FIG. 2 transmits an empty cell through the serial link, the latter incorporates the contents of the register 11 into the cell, at the appropriate location so that it can be detected by the deserializer 1180 at the opposite side of the serial link 40 (represented by multiwires 4400) and finally copied into the register 21 (not shown in FIG. 2).

When the counting process reaches the k value without occurrence of an empty cell, then a specific processing occurs within the boundaries of module 1110, what causes deserializer 1170 to transmit a flow control transmit (FCX) signal on lead 9500-i to the switch core element 450 during one cell cycle. The transmission of this signal is particularly described in the above mentioned application, and is very simple to embody since the module 1110 and the switch core 450 are located at the same physical area. This flow control transmit (FCX) signal causes an empty cycle at the output port of 450 and, thus, provides serializer 1190 with an appropriate empty cell that is used for transporting the state of the register 11.

With respect to FIG. 3, there is shown the creation of an empty cell between SCAL 20 and switching structure 10 so that the contents of register 22 (for instance) within SCAL element 20 can be conveyed to switching structure 10. In order to achieve the empty cell creation, module 1115 uses an edge detector for detecting the changes brought to register 22 (not shown in FIG. 3) and a hardware counter that is used for counting a predetermined number of cell cycles (for instance k).

In the invention, whenever the serializer (SER) 1160 that is represented in FIG. 3 transmits an empty cell through the serial link, the latter incorporates the contents of the register 22 into the cell, at the appropriate location so that it can be detected by the deserializer 1170 at the opposite side of the serial link 40 (represented by multiwires 1400) and finally copied into the register 12 (not shown in FIG. 3).

When the counting process reaches the value k without occurrence of an empty cell, then a specific processing occurs within the boundaries of module 1115, which causes deserializer 1180 to transmit a flow control receive (FCR) signal on lead 9520-i to the protocol interface (PINT) element 511-i during one cell cycle. The transmission of this signal is particularly described in the above mentioned application, and is very simple to embody since the module 1115 and the PINT element 511 are located at the same physical area. This flow control receive (FCR) signal causes an empty cycle at the output port of 511 and, thus, provides serializer 1160 with an appropriate empty cell that is used for transporting the state of the register 22.

What is claimed is:

1. A flow control process for a switching architecture comprising a switching structure and distributed Switch Core Access Layer elements connected through at least one communication link wherein the dataflow is coded in accordance with the 8B/10B coding scheme, said process comprising using two among the three available comma characters for creating an additional flow control channel which is conveyed in parallel with the normal data flow.

2. The process according to claim 1 wherein, when a cell is idle or empty, the nature of the comma character appearing at the beginning of the cell provides an appropriate flow control bit information to be transmitted on said communication link.

3. The process according to claim 2 wherein a K.28.5 comma character is used and decoded by the receiving entity as a positive flow control information corresponding to a request to reduce the data flow.

4. The process according to claim 2 further comprising using the empty cells as a second control channel for transporting quasi-static information that does not require immediate transport.

5. The process according to claim 4 wherein the quasi-static information is copied into the empty cell following the comma character for transport with the cell.

6. The process according to claim 5 wherein the quasi-static information is to be transported within a maximum amount of time after a triggering event and wherein the process further comprises:

monitoring for the triggering event;

tracking the time passed following the triggering event;

in response to the passage of the maximum time after the triggering event without transporting the quasi-static information, causing an empty cell to be transported through the switching structure.

7. The process according to claim 6 wherein the triggering event is an updating of the quasi-static information and wherein the maximum time is counted in cell cycles.

8. The process according to claim 2 wherein a K.28.1 comma character is used and decoded by the receiving entity as a positive flow control information corresponding to a request not to reduce the data flow.

9. The process according to claim 1 wherein when an incoming flow provides data cells, a predetermined bit is used within the data cells for carrying the flow control information.

* * * * *